United States Patent
Yuem

[11] Patent Number: 5,757,152
[45] Date of Patent: May 26, 1998

[54] SPEED CONTROL METHOD FOR BRUSHLESS DC MOTOR

[75] Inventor: Kwan-ho Yuem, Bucheon, Rep. of Korea

[73] Assignee: LG Electronics Inc., Seoul, Rep. of Korea

[21] Appl. No.: 768,797

[22] Filed: Dec. 18, 1996

[30] Foreign Application Priority Data

Jun. 20, 1996 [KR] Rep. of Korea ............... 1996-22577

[51] Int. Cl.$^6$ ...................... H02F 6/02; H02F 5/40
[52] U.S. Cl. .................. 318/254; 318/138; 318/245; 318/439
[58] Field of Search ............... 318/138, 245, 318/254, 439, 600–632; 388/800–820

[56] References Cited

U.S. PATENT DOCUMENTS

| | | | |
|---|---|---|---|
| 4,743,815 | 5/1988 | Gee et al. | 318/254 |
| 4,879,502 | 11/1989 | Endo et al. | 318/723 |
| 5,298,839 | 3/1994 | Takeda | 318/254 |
| 5,300,866 | 4/1994 | Yashohara et al. | 318/254 |
| 5,378,976 | 1/1995 | Inaji et al. | 318/810 |
| 5,461,293 | 10/1995 | Rozman et al. | 318/603 |
| 5,530,326 | 6/1996 | Galvin et al. | 318/254 |
| 5,633,568 | 5/1997 | Dunfield | 318/254 |

*Primary Examiner*—Paul Ip
*Attorney, Agent, or Firm*—Birch, Stewart, Kolasch & Birch, LLP

[57] ABSTRACT

A speed control method for a brushless DC (BLDC) motor capable of solving the phases distortion problem generated between an applied voltage and a winding current of the motor during a high speed rotation of the motor. According to the method, the present revolution per minute (RPM) of the motor is detected, and an output control wave of a new pattern is obtained utilizing a value of an advance phase angle determined according to the detected RPM of the motor. Accordingly, the rotation of the motor is controlled by the new pattern control wave in response to the motor rotation of a high, intermediate or low speed, and thus the phase distortion generated between the applied voltage and the winding current of the motor can be prevented, resulting in the improvement of the motor efficiency. The method may be applied to a typical sensorless BLDC motor.

2 Claims, 3 Drawing Sheets

FIG. 3
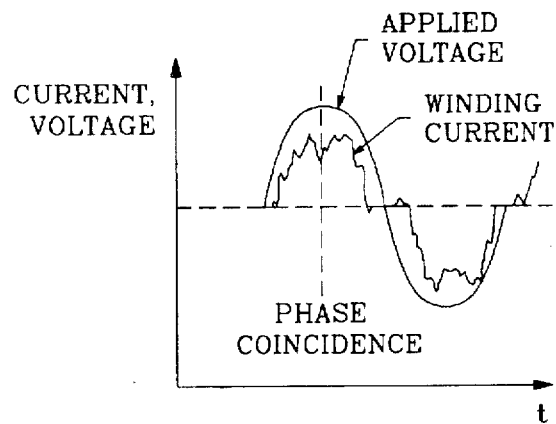
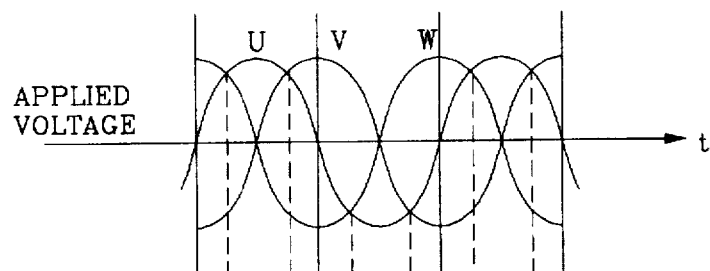
FIG. 5A
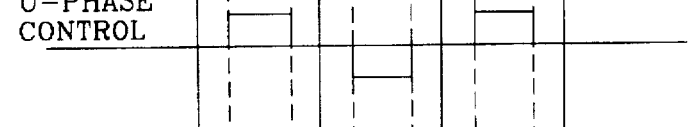
FIG. 5B
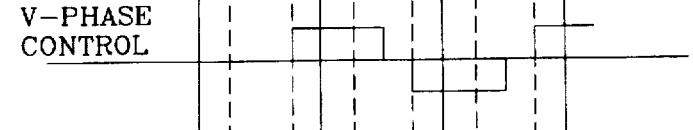
FIG. 5C
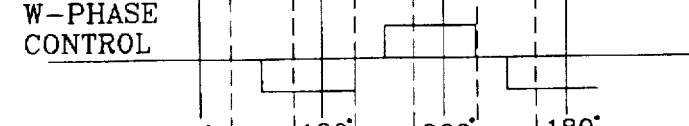
FIG. 5D
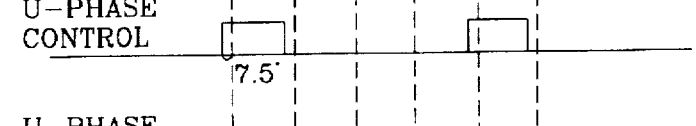
FIG. 5E
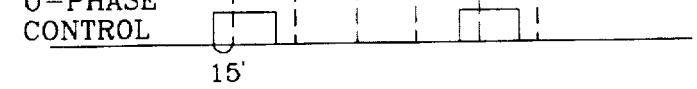
FIG. 5F

SPEED CONTROL METHOD FOR BRUSHLESS DC MOTOR

BACKGROUND OF THE INVENTION

1. Field of the Invention

The present invention relates generally to the speed control of a brushless direct current (BLDC) motor having no sensor as its component, and more particularly to a speed control method for a BLDC motor which can solve the phase distortion problem generated between an applied voltage and a winding current of the motor during a high speed rotation of the motor.

2. Description of the Prior Art

As shown in FIG. 1, a conventional driving apparatus of a sensorless BLDC motor comprises a control section 1 for providing control signals with respect to respective phases U, V, and W of the motor to control the operation of the motor 5, a driving section 2 for driving the motor 5 in accordance with the control signals inputted from the control section 1, an inverter section 3 composed of a plurality of transistors Q1 to Q6 for switching the phases U, V, and W in accordance with the control signal provided through the driving section .2, and an inverse electromotive force detection section 4 for detecting an inverse electromotive force (EMF) from the inverter section and providing the detected inverse EMF to the control section 1.

In the drawing, the reference numeral 6 denotes an AC power supply section, and 7 denotes a rectifying section.

The operation of the conventional speed control apparatus of the BLDC motor as constructed above will now be explained.

Referring to FIG. 1, the AC power supply of 220V, 60 Hz supplied from the power supply section 6 is rectified to a DC power supply of 311 V by the rectifying section 7.

The rectified power supply is applied to the inverter section 3, and the phases respectively receive the rectified power supply according to the switching operation of the inverter section 3, causing the motor 5 to rotate.

At this time, the control section 1 outputs the control signals to the driving section 2, and thus the driving section 2 operates to cause the inverter section 3 to perform a switching operation. The control section 1 detects the inverse RMF of the voltage supplied to the motor 5 to detect the position of the rotor of the motor 5, and discriminates the rotating speed of the motor 5 utilizing the detected positional information of the rotor.

Then, the control section 1 compares the discriminated rotating speed of the motor 5 with a target speed, and outputs the control signals to the driving section 3 according to the comparison result, so that the motor 5 is controlled to rotate with the target speed.

In case of a three-phase motor as shown in the drawing, the control section 1 outputs six pulse width modulation (PWM) pulse signals to control the operation of the motor 5.

The six pulse waves outputted as above are transferred to the inverter section 3 through the driving section 2, and switch-control the transistors Q1 to Q6 which correspond to the respective phases U, V, and W resulting in that the respective power supplies provided to the phases of the motor 5 are controlled to drive the motor 5.

However, the conventional motor speed control apparatus has the drawback in that it reduces the efficiency of the motor since in the event that the control for the advanced phase angle is not performed while the motor rotates at a high revolution per minute (RPM), the electric time constant (L/R) on the winding of the motor 5 increases, and thus, as shown in FIG. 2, the phase distortion, i.e., the phase difference θ is generated between the applied voltage and the winding current of the motor 5.

SUMMARY OF THE INVENTION

The present invention has been made to solve the problems involved in the prior art. Therefore, it is an object of the present invention to provide a method of controlling the speed of a BLDC motor which can prevent the phase distortion generated between an applied voltage and a winding current during a high speed rotation of the motor and thus improve the efficiency of the motor by providing output control waves of new patterns utilizing an advanced phase angle determined according to the detected RPM of the motor so as to rotate the motor according to the new patterned waves which correspond to high, intermediate, and low speeds of the motor, respectively.

In order to achieve the above object, there is provided a method of controlling the speed of a BLDC motor comprising the steps of:

detecting the present revolution per minute (RPM) of the motor;

recognizing a rotating mode of a high, intermediate, or low speed according to the detected RPM, and determining an advanced phase angle to be controlled according to the recognized rotating mode;

loading the value of the determined advanced phase angle;

determining a new value of a pattern output timer by calculating a predetermined value of the pattern output timer and the value of the loaded advanced phase angle; and providing a new pattern wave to the motor by operating a timer by the new value of the pattern output timer.

BRIEF DESCRIPTION OF THE DRAWINGS

The above object, other features and advantages of the present invention will become more apparent by describing the preferred embodiment thereof with reference to the accompanying drawings, in which:

FIG. 3 is a waveform diagram illustrating the applied voltage and the winding current of the BLDC motor in case that the control of an advanced phase angle is performed in accordance with the BLDC motor speed control method of the present invention.

FIGS. 5A to 5F are waveform diagrams illustrating control signals outputted from the control section in response to the applied voltage, wherein:

FIG. 5A is a waveform diagram illustrating the applied voltages of U, V, and W-phases;

FIGS. 5B to 5D are waveform diagrams illustrating the control signals for U, V, and W-phases, respectively; and FIGS. 5E and 5F are waveform diagrams illustrating the control signals for U-phase obtained by the control of the advanced phase angle.

DETAILED DESCRIPTION OF THE PREFERRED EMBODIMENTS

Figure 1:
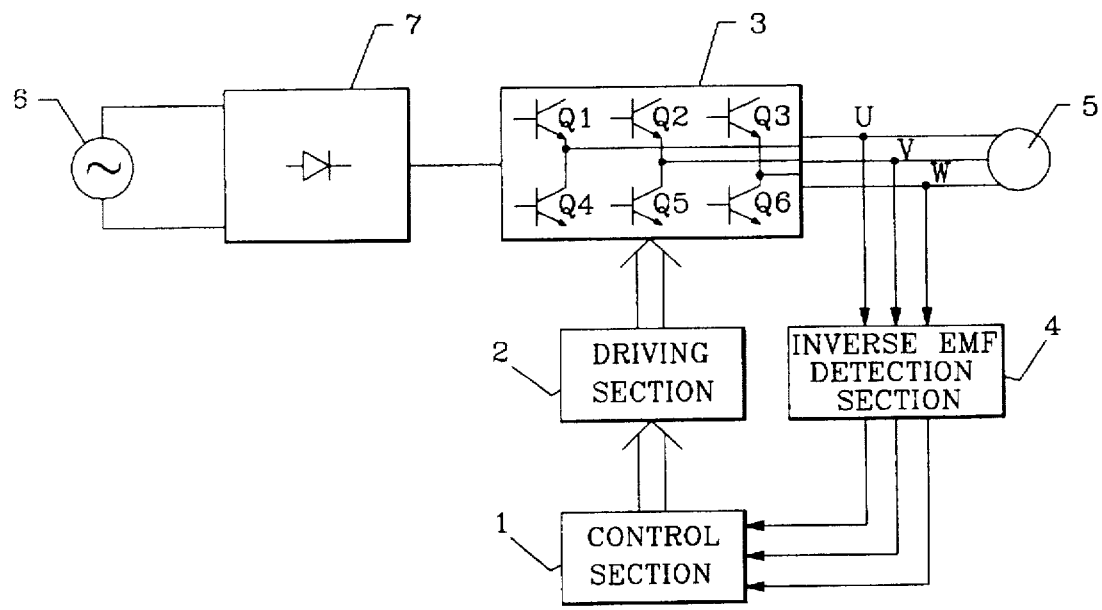
FIG. 1 is a block diagram of a conventional driving apparatus of a sensorless BLDC motor.
Figure 2:
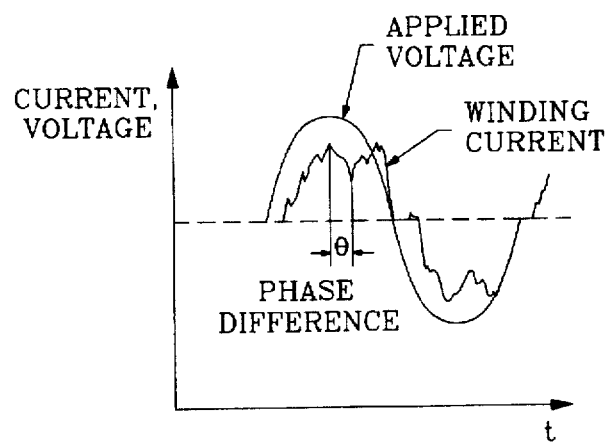
FIG. 2 is a waveform diagram illustrating the applied voltage and the winding current of the BLDC motor in case that the control of an advanced phase angle is not performed.
Figure 4:
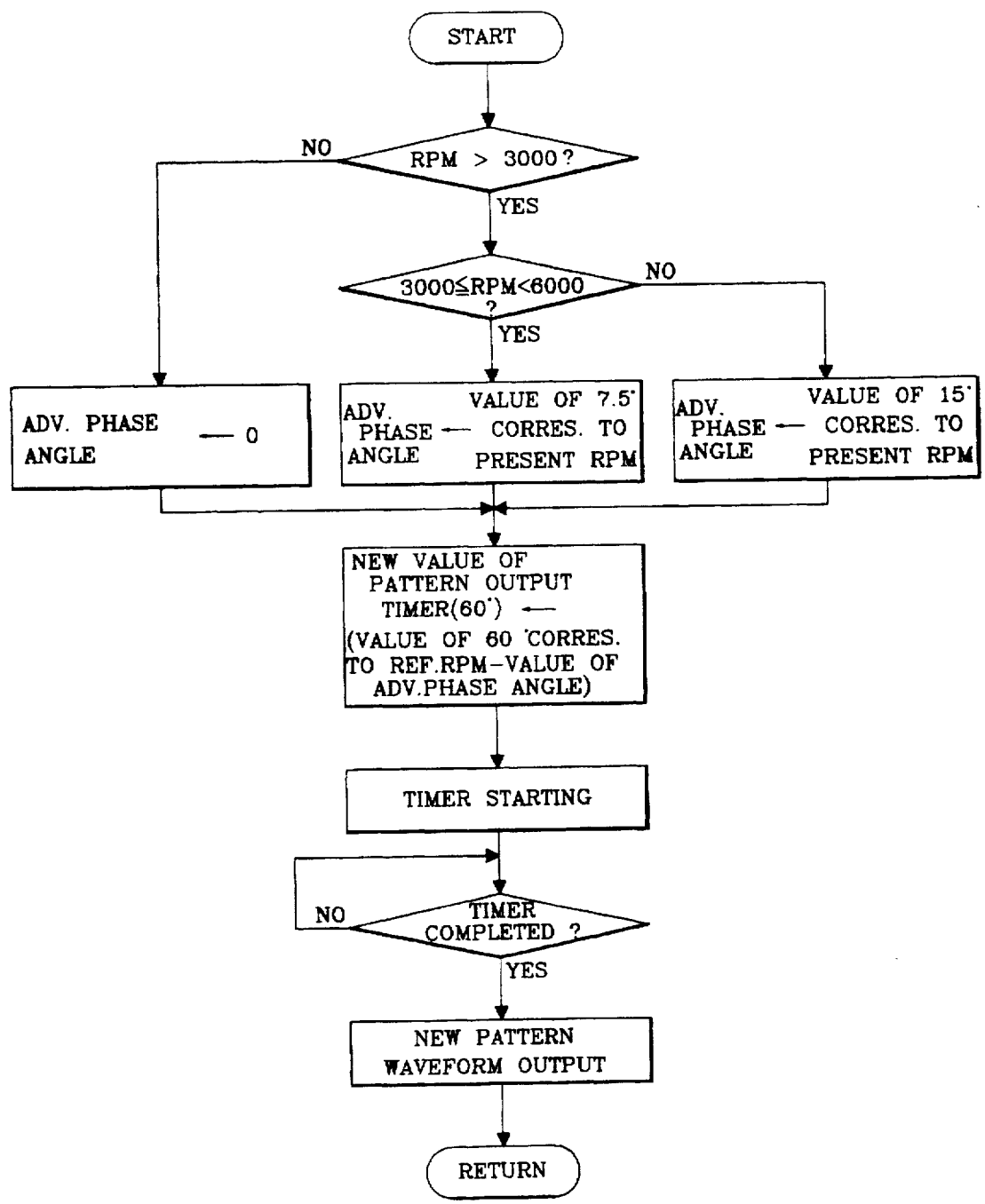
FIG. 4 is an algorithm diagram explaining the BLDC motor speed control method according to the present invention.

FIG. 4 is an algorithm diagram explaining the speed control method of a BLDC motor according to the present invention.

Referring to FIG. 4, the BLDC motor speed control method according to the present invention comprises the steps of detecting the present RPM of the motor, recognizing the rotating mode corresponding to the detected RPM of the motor and determining the advanced phase angle according to the recognized rotating mode, reading the determined value of the advanced phase angle, determining a new value of a pattern output timer by subtracting the advanced phase angle value from the value of 60° of the pattern output timer corresponding to the present RPM, and outputting a new pattern wave by operating a timer by the new value of the pattern output timer.

Practically, the advanced phase angle determining step may comprise the substeps of determining the advanced phase angle as 0° in case that the detected RPM of the motor is less than 3000, determining the advanced phase angle as 7.5° in case that the detected RPM of the motor is 3000 or more, but is less than 6000, and determining the advanced phase angle as 15° in case that the detected RPM of the motor is more than 6000.

In the embodiment of the present invention comprising the above-described steps, the present RPM of the motor is detected, and the voltage being supplied to the motor is controlled according to the advanced phase angle if the motor is determined to rotate at a high speed as a result of the detected RPM, thereby solving the phase distortion generated when the motor rotates at a high speed.

Specifically, if the detected RPM is less than 3000, the advanced phase angle is not considered, and a new pattern wave is outputted to the motor by utilizing the existing value of 60° of the pattern output timer which corresponds to the present RPM of the motor.

If the detected RPM of the motor is 3000 or more, but less than 6000, the value of 7.5° among the values preset in a time table is read out to be used as the value of the advanced phase angle. A new value of the pattern output timer is determined by subtracting the advanced phase angle value of 7.5° from the existing value of 60° of the pattern output timer corresponding to the present RPM of the motor. A new pattern wave is outputted according to the new pattern output timer value to control the rotation of the motor.

In the meantime, if the motor rotates at a high speed of more than 6000 RPM, the advanced phase angle value of 15° is read out from the time table, and a new pattern wave is outputted to the motor through the same calculation process as described above.

For example, in case that the advanced phase angle is 7.5°, and the RPM of the motor is 3600, we have 3600 revolution/60 seconds=60 rev.1 sec.

Thus 1 rev.=1/60 sec.=16.7 ms (in case of 4-pole motor, 720°, and in case of 2-pole motor, 360°)

60°=1/12×16.7 ms=1400 μs (in case of 4-pole motor)

Data of advanced phase angle=7.5/60×1400 μs=175 μs. Accordingly

New value of pattern output timer=1400 μs−175 μs=1225 μs.

In other words, when the applied voltages of three phases as shown in FIG. 5A is supplied to the respective phases, the control section outputs the control waveforms as shown in FIGS. 5B to 5D to the U, V, and W phases, respectively.

In this case, if the advanced phase angle is considered as described above, the control waveform as shown in FIG. 5E or FIG. 5F is provided to control the rotation of the motor. FIG. 3 shows the phase coincidence state of the phases achieved by the control of the advanced phase angle.

Here, FIG. 5E exemplifies the U-phase control waveform in case of the advanced phase angle of 7.5°, and FIG. 5F exemplifies the U-phase control wave in case of the advanced phase angle of 15°. The same effect will appear with respect to V and W-phase waveforms.

From the foregoing, it will be apparent that the speed control method of a BLDC motor according to the present invention has the advantages in that it can prevent the phase distortion generated during the high speed rotation of the motor and thus improve the efficiency of the motor by performing the control of the advanced phase angle according to the RPM of the motor without the necessity of the additional hardware construction.

While the present invention has been described and illustrated herein with reference to the preferred embodiment thereof, it will be understood by those skilled in the art that various changes in form and details may be made therein without departing from the spirit and scope of the invention.

What is claimed is:

1. A speed control method for a brushless DC motor, comprising the steps of:

detecting the present revolution per minute (RPM) of the motor;

recognizing a rotating mode of a high, intermediate, or low speed according to the detected RPM, and determining an advanced phase angle to be controlled according to the recognized rotating mode;

loading the value of the determined advanced phase angle;

determining a new value of a pattern output timer by calculating a predetermined value of the pattern output timer and the value of the loaded advanced phase angle; and providing a new pattern wave to the motor by operating a timer by the new value of the pattern output timer.

2. A speed control method as claimed in claim 1, wherein the new pattern wave obtained by the new value of the pattern output timer is provided to respective phases of the motor.

* * * * *